Dec. 1, 1964  C. D. FLANAGAN  3,159,768
THERMAL RESPONSIVE CIRCUIT BREAKING RELAY
Filed Dec. 16, 1959

Charles D. Flanagan,
Inventor.
Koenig and Pape,
Attorneys.

United States Patent Office 3,159,768
Patented Dec. 1, 1964

3,159,768
THERMAL RESPONSIVE CIRCUIT BREAKING RELAY
Charles D. Flanagan, Attleboro, Mass., assignor to Texas Instruments Incorporated, Dallas, Tex., a corporation of Delaware
Filed Dec. 16, 1959, Ser. No. 860,004
4 Claims. (Cl. 317—41)

This invention relates to circuit-breaking apparatus, and more particularly to such apparatus which protects against overload of electrical equipment.

Among the several objects of the invention may be noted the provision of circuit-breaking apparatus which will automatically deenergize an electrical load when its temperature exceeds a predetermined value; the provision of apparatus of the class described that will fail safe; the provision of such apparatus that is substantially unaffected by line voltage variations; the provision of circuit-breaking apparatus in which the differential between the point of actuation and the point of deactuation may be conveniently adjusted; and the provision of such apparatus which is inexpensive to manufacture and reliable in operation. Other objects and features will be in part apparent and in part pointed out hereinafter.

The invention accordingly comprises the constructions hereinafter described, the scope of the invention being indicated in the following claims.

Figure 1:
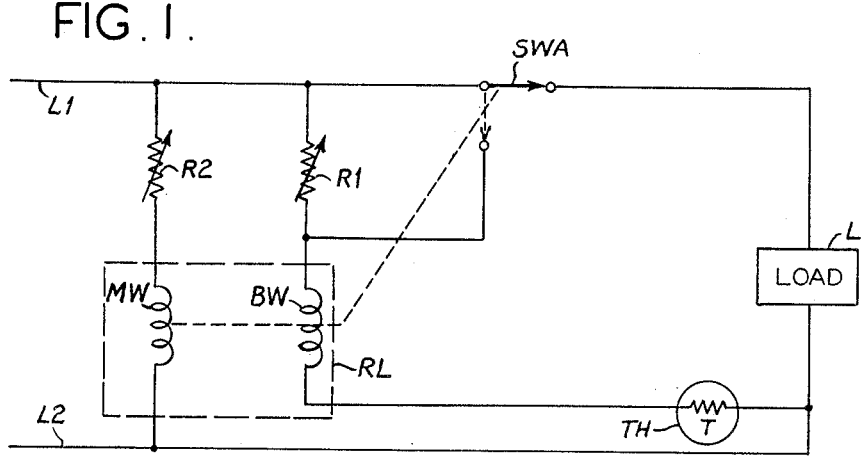
Figure 2:
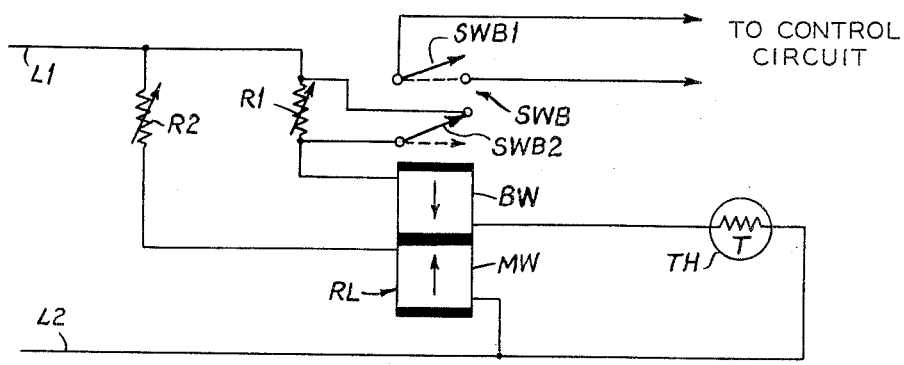

In the accompanying drawings, in which several of various possible embodiments of the invention are illustrated, FIGS. 1 and 2 are schematic circuit diagrams of two different embodiments of circuit-breaking apparatus of the present invention.

Corresponding reference characters indicate corresponding parts throughout the several views of the drawings.

In the manufacture of circuit-breaking apparatus for the protection of electrical equipment, such as motors and the like, against damage from overload and overheating, various temperature-sensing devices may be utilized. For example, a thermistor (e.g., high-negative-temperature-coefficient resistance element of semiconductive material) may be used for this purpose. However, circuit breakers embodying such temperature-responsive sensing units have been relatively unreliable in operation because of their sensitivity to line voltage variations. Moreover, it is difficult to produce such a device which will fail safe, i.e., the apparatus will disconnect the electrical load being protected in the event of an opening or short circuiting of components of the circuit-breaking apparatus, as well as upon an increase in the temperature of the electrical load above safe levels.

In accordance with the present invention, circuit-breaking apparatus is provided which will reliably protect an electrical load against overheating without being sensitive to line voltage variations and will fail safe. In essence, the invention comprises a differential relay in which one of the windings is series-connected with a thermistor across a source of electrical power while the other winding is shunt-connected across the source of power. The thermistor is thermally coupled or in heat-exchange relationship with an electrical motor, or other electrical load, to sense its temperature, whereby switching means which are associated with the differential relay will be actuated to deenergize the electrical load upon the temperature of the load exceeding a predetermined value, or upon the opening or short circuiting of any of the circuit-breaker components.

Referring now to FIG. 1, an electrical load, such as an electrical motor, is indicated at L connected across a source of electrical power L1, L2. A differential relay including a main relay coil or winding MW and a bucking or auxiliary winding or coil BW is shown generally at RL. The bucking relay winding is series-connected with a variable resistor R1 and a thermistor TH across L1, L2, while the main winding MW is serially connected with a second adjustable resistor R2 across L1, L2. These windings BW and MW are associated in accordance with customary practice in the usual magnetic circuit (including a core of magnetic material, such as laminations of silicon steel) with a movable armature which actuates switch means, such as indicated at SWA, a double-throw single-pole switch. MW and BW are arranged and connected so as to produce opposing magnetic fields, the flux in the magnetic circuit being the algebraic sum or composite of these two opposing fields. The thermistor TH is located in close physical association with load L, preferably in or touching the windings if L is a motor, whereby there is thermal coupling or good heat transfer between the load and thermistor TH.

Operation is as follows: Upon connection of L1 and L2 to a source of electrical power, current will flow in the three parallel or shunt circuits, the first circuit including load L and the normally closed contacts of SWA (solid-line position), thereby energizing load L. The second shunt circuit includes rheostat R1, relay winding BW and thermistor TH, while the third shunt circuit includes rheostat R2 and relay winding MW. The current in the latter winding is a function of the line voltage of L1, L2 and the series impedance of R2 and MW. The current traversing BW is dependent on the line voltage, the respective resistances of R1 and TH, and the impedance of BW. The parameters are such that the respective currents flowing through BW and MW may be adjusted so that the opposing magnetic fields produce a composite flux in the magnetic circuit of RL which is less than that needed to actuate or pull in the relay armature when the operating temperature of load L is within a predetermined safe operating range. Upon an overload on L of such a nature as to cause a rise in its temperature above this safe level, the resistance of thermistor TH will decrease, thus increasing the current through BW to such an extent that the composite flux in the magnetic circuit of RL exceeds that required to pull in the relay armature and actuate SWA to its second or dashed-line position. This action of switch SWA shunts resistor R1 and the diminished resistance in the branch circuit including BW and TH further increases the current flow through BW. The shunting of R1 effectively increases the relay actuating differential (i.e., the difference in the temperature between TH necessary to cause actuation of the armature of RL, and that temperature below which TH must fall to permit relay RL to drop out or become deactuated). Thus, bias resistor R1 serves not only to preselect the temperature of the load L (and of TH because of its thermal sensing action) at which the relay will initially become actuated, but also the amount of increase in the relay temperature differential when the arm of SWA moves to its dashed-line position. Although rheostat R1 may be omitted, it is preferred in this embodiment that it be employed inasmuch as its shunting delays the dropout of relay RL as thermistor TH and load L gradually cool. Adjustable resistor R2 is also an optional component, functioning to adjust the magnetic flux field produced in the relay's magnetic circuit by winding MW.

It will be noted that this circuit-breaking apparatus is independent of line voltage variation, inasmuch as an increase or decrease in the line voltage equally affects the opposing fields of the parallel-connected windings BW and MW. Not only are line voltage variations automatically compensated by this apparatus, but it will fail safe. For example, if thermistor TH becomes short circuited, the decreased resistance in the short circuit including BW will cause a sharp rise in current through BW, thus actuating the armature of RL and switch SWA to deenergize load L. The short circuiting of any one of the components R1, R2, MW or BW could cause a similar effect, i.e., an increase in the composite magnetic flux of RL sufficient to actuate switch SWA. The composite flux on the relays' magnetic current is also similarly increased if an open circuit should occur in either of the two parallel relay winding circuits including MW or BW. If the circuits to either MW or BW were opened, the magnetic field of either (not being opposed by the magnetic field of the other) would cause an increase in the flux in the magnetic circuit of RL, thereby actuating SWA to its dashed-line position. Thus, either an open circuit or short circuit of any one of the components would actuate SWA to its second position and effect fail-safe operation of the circuit-breaking apparatus of the present invention.

The FIG. 2 embodiment is similar to that of FIG. 1 except that a different switching means SWB is employed and an indirect rather than a direct control of the circuit for the electrical load is used. SWB comprises a double-pole single-throw switch in which upper contacts SWB1 are normally open and in series with a control circuit for the electrical load. A second set of normally closed contacts SWB2 are shunt-connected across R1. Thermistor TH is again thermally coupled to or in close heat-exchange relationship with the electrical load. Again, as in the preceding embodiment, the fields of MW and BW oppose each other and relay RL will not be actuated until the current through one of the windings BW or MW is significantly decreased or increased relative to the other, such as by TH being heated to a temperature above a predetermined value. Upon the composite flux in the magnetic circuit of RL increasing to the value necessary to actuate the relay armature, SWB is moved to its dashed-line position, closing the control circuit and opening the normally shunted (in this embodiment) resistor R1. The net effect of opening the SWB2 contacts is to decrease rather than increase (as in FIG. 1) the differential of the relay. Thus in this FIG. 2 circuit breaker the current through BW is increased by the temperature rise of TH until the composite magnetic flux is increased to a point where the armature of RL is pulled in. The concomitant opening of contacts SWB2 increases the resistance of the shunt circuit including BW and TH by the effective resistance of R1, thereby diminishing the current flow therethrough and decreasing the net magnetic flux so that a slight decrease in the temperature of TH will cause dropout of relay RL. Thus, this FIG. 2 circuit-breaker apparatus will cycle automatically closing and reopening the control circuit as TH heats and cools between fairly close predetermined temperature limits.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

I claim:

1. In circuit-breaking apparatus for an electrical load adapted to be energized from a source of electrical power, a differential relay having a relay armature associated in a magnetic circuit with a main relay coil and a bucking relay winding, said coil and winding being parallel-connected across said power source and adapted to produce opposing magnetic fields in said magnetic circuit, connected across said power source whereby the respective currents traversing said relay coil and relay winding are independent of said load current, said armature adapted to be actuated when the composite flux produced by said coil and winding in said magnetic circuit exceeds a preselected value, a resistance comprising a thermistor serially connected between said bucking relay winding and said source of electrical power, switch means operable by said armature between a first position when said relay armature is deactuated and a second position when said armature is actuated, said switch means adapted when in said second position to deenergize said electrical load, and said thermistor being in heat-exchange relationship with said electrical load whereby upon a predetermined change in said resistance in series with said bucking winding the composite flux in said magnetic circuit is increased above said preselected value thereby moving said switch means to its second position to deenergize said electrical load.

2. In circuit-breaking apparatus as set forth in claim 1, a resistor serially connected with said bucking winding and said thermistor, said switch means including contacts adapted to modify the resistance of said resistor when said switch means is in said second position whereby the differential of said relay is changed.

3. Circuit-breaking apparatus comprising a differential relay having a relay armature associated in a magnetic circuit with a main relay coil and a bucking relay winding, said armature adapted to be actuated when the composite flux produced by said coil and winding in said magnetic circuit exceeds a predetermined value and to be deactuated upon said flux decreasing below a second predetermined value, a thermistor and a resistor adapted to be serially connected with said bucking relay winding across a source of electrical power, said main relay coil also being adapted to be connected across said power source, switch means operable by said armature between a first position when said relay armature is deactuated and a second position when said relay armature is actuated, said switch means adapted when in said second position to deenergize an electrical load, said switch means including a set of contacts shunt-connected across said resistor and adapted to be closed to increase the differential of said relay when said switch means is in its second position, and said thermistor being in heat-exchange relationship with said electrical load whereby upon the temperature of said thermistor increasing above a predetermined value the current through said bucking winding is increased to actuate said relay armature and move said switch means to its second position thereby deenergizing said electrical load and shunting said resistor.

4. Circuit-breaking apparatus as set forth in claim 3 in which said resistor is adjustable whereby the predetermined thermistor temperature value which will cause actuation of said armature may be varied.

References Cited in the file of this patent
UNITED STATES PATENTS

| | | |
|---|---|---|
| 1,915,137 | Stevens | June 20, 1933 |
| 2,345,155 | Reagan | Mar. 28, 1944 |
| 2,463,935 | Fish | Mar. 8, 1949 |
| 2,766,406 | Schwarzkopf | Oct. 9, 1956 |
| 2,774,015 | White | Dec. 11, 1956 |
| 2,998,551 | Moakler | Aug. 29, 1961 |

FOREIGN PATENTS

| | | |
|---|---|---|
| 382,565 | Great Britain | Oct. 27, 1932 |
| 623,970 | Great Britain | May 25, 1949 |
| 643,695 | Great Britain | Sept. 27, 1950 |

UNITED STATES PATENT OFFICE
CERTIFICATE OF CORRECTION

Patent No. 3,159,768　　　　　　　　　　　　　December 1, 1964

Charles D. Flanagan

It is hereby certified that error appears in the above numbered patent requiring correction and that the said Letters Patent should read as corrected below.

Column 3, line 55 and 56, for "construction" read -- constructions --; lines 67 and 68, for "circuit, connected across" read -- circuit, said electrical load being parallel-connected across --.

Signed and sealed this 20th day of April 1965.

(SEAL)
Attest:

ERNEST W. SWIDER
Attesting Officer

EDWARD J. BRENNER
Commissioner of Patents